United States Patent
Okimura et al.

(10) Patent No.: US 7,189,673 B2
(45) Date of Patent: Mar. 13, 2007

(54) DIELECTRIC MATERIAL

(75) Inventors: Yasuyuki Okimura, Inuyama (JP);
Takashi Kasashima, Ichinomiya (JP);
Takeshi Mitsuoka, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 52 days.

(21) Appl. No.: 10/968,052

(22) Filed: Oct. 20, 2004

(65) Prior Publication Data

US 2006/0068983 A1    Mar. 30, 2006

(30) Foreign Application Priority Data

Sep. 30, 2004   (JP)  .......................... P. 2004-288660

(51) Int. Cl.
C04B 35/465   (2006.01)
C04B 35/47    (2006.01)
C04B 35/495   (2006.01)

(52) U.S. Cl. ................................... 501/136

(58) Field of Classification Search ................. 501/136
See application file for complete search history.

(56) References Cited

U.S. PATENT DOCUMENTS 5,356,844 A    10/1994   Hirahara et al.
6,403,512 B1 *  6/2002   Ishikawa et al. ............ 501/136
6,599,854 B2 *  7/2003   Fujinaga et al. ............ 501/136

OTHER PUBLICATIONS

Translation of Japansese Document 2002-308670, Oct. 2002.*
Patent Abstracts of Japan, vol. 2002, No. 02, Apr. 2, 2002 & JP 2001 302331 A (UBE Electronics Ltd), Oct. 31, 2001.
Patent Abstracts of Japan, vol. 2002, No. 02, Apr. 2, 2002 & JP 2001 302333 A (UBE Electronics Ltd), Oct. 31, 2001.
Patent Abstracts of Japan, vol. 2003, No. 02, Feb. 5, 2003 & JP 2002 308670 A (NGK Spark Plug Co Ltd), Oct. 23, 2002.
Patent Abstracts of Japan, vol. 2003, No. 01, Jan. 14, 2003 & JP 2002 255640 A (UBE Electronics Ltd), Sep. 11, 2002.

\* cited by examiner

*Primary Examiner*—Karl Group
(74) *Attorney, Agent, or Firm*—Sughrue Mion, PLLC (57) ABSTRACT

A dielectric material containing at least one of Ca and Sr, Ti, Al, at least one of Nb and Ta, and O, wherein these elements fulfill the following four requirements when represented by a compositional formula, $aM^1O\text{-}bTiO_2\text{-}(1/2)cAl_2O_3\text{-}(1/2)dM^2{}_2O_5$ wherein $M^1$ represents the at least one of Ca and Sr; $M^2$ represents the at least one of Nb and Ta; and a, b, c and d represent each a molar ratio, provided that $a+b+c+d=1$: $0.436 < a \leq 0.500$; $0.124 < b \leq 0.325$; $0.054 < c \leq 0.150$; and $0.170 < d < 0.346$.

16 Claims, 3 Drawing Sheets

DIELECTRIC MATERIAL

FIELD OF THE INVENTION

This invention relates to a dielectric material and an electronic component using the same. More specifically, it relates to a dielectric material having a relatively high dielectric constant ($\in_x$), a large unloaded quality factor (Qu) and a small absolute value of temperature factor ($\tau_f$) of resonance frequency and an electronic component using the same.

BACKGROUND OF THE INVENTION

With the rapid advancement of various communication systems with the use of electromagnetic waves in the microwave area including mobile communication such as cellular phones and satellite broadcasting, a great number of dielectric materials have been developed. In these dielectric materials, priorities are given on three dielectric characteristics, namely, dielectric constant ($\in_r$), unloaded quality factor (Qu) and temperature factor ($\tau_f$) of resonance frequency. In general, such a dielectric material should have a high $\in_r$, a large Qu and a small absolute value of $\tau_f$. However, it is highly difficult to meet all of these requirements at the same time, since they are incompatible with each other. Therefore, it is desired to control each of these characteristics within a range according to need.

Known dielectric materials to be employed for the above purposes include BaO—ZnO—Ta$_2$O$_5$ based materials (Ba-ZnTa-based materials) having $\in_r$ of about 20 to 30 which are disclosed in the following JP-B-59-48484, and BaO—RE$_2$O$_3$—TiO$_2$ (RE: rare earth element) based materials (Ba-RETi-based materials) having $\in_r$ of about 60 to 80 which are disclosed in the following JP-B-59-37526. These materials have been employed in practice as materials for high-frequency resonators and filters. However, few materials can still exert intermediate $\in_r$ values and thus it has been required in recent years to develop materials having intermediate $\in_r$ values and being available for high-frequency purposes.

As such materials, CaO—TiO$_2$—Al$_2$O$_3$—Nb$_2$O$_5$ based materials (CaTiAlNb-based materials) disclosed in JP-A-2001-302331 and JP-A-2001-302333, and JP-A-2002-308670 filed by the present inventors are known.

SUMMARY OF THE INVENTION

However, the materials according to JP-A-2001-302331 and JP-A-2001-302333 show large scattering in $\tau_f$, which makes it difficult to achieve well-balanced dielectric characteristics in detail. Although the material according to JP-A-2002-308670 has excellent properties and shows controlled scattering in $\tau_f$ and a relatively large Qu, it suffers from a problem of having a relatively low $\in_r$.

The invention, which has been completed under the circumstances as described above, aims at providing a dielectric material that can exert an $\in_r$ within the intermediate region and a sufficiently controlled $\tau_f$ while sustaining well-balanced $\in_r$ and Qu and an electronic component using the same.

The invention is as follows.

(1) A dielectric material containing at least one of Ca and Sr, Ti, Al, at least one of Mb and Ta and O, wherein these elements fulfill the following requirements when represented by a compositional formula [aM$^1$O-bTiO$_2$-(½)cAl$_2$O$_3$-(½)dM$^2{}_2$O$_5$] (wherein M$^1$ represents Ca and/or Sr; M$^2$ represents Nb and/or Ta; and a, b, c and d represent each a molar ratio, provided that a+b+c+d=1):

0.436<a≦0.500;

0.124<b≦0.325;

0.054<c≦0.150; and 0.170<d<0.346.

(2) The dielectric material as described in the above (1) wherein a, b, c and d fulfill the following requirements:

0.436<a≦0.500;

0.124<b≦0.300;

0.062<c≦0.150; and 0.170<d<0.346.

(3) The dielectric material as described in the above (1) wherein a, b, c and d fulfill the following requirements:

0.436<a≦0.500;

0.124<b≦0.275;

0.069<c≦0.150; and 0.170<d<0.346.

(4) The dielectric material as described in the above (1) wherein a, b, c and d fulfill the following requirements:

0.444<a≦0.500;

0.133<b≦0.275;

0.075<c≦0.150; and 0.170<d≦0.323.

(5) The dielectric material as described in the above (1) wherein a, b, c and d fulfill the following requirements:

0.451<a≦0.500;

0.141<b≦0.275;

0.079<c≦0.150; and 0.170<d≦0.300.

(6) A dielectric material as described in any of the above (1) to (5) which contains 0.01 to 5% by mol of Mn in terms of MnO$_2$ by referring the total molar content of the metal elements, in terms of oxides, contained in the dielectric material as to 100% by mol.

(7) A dielectricmaterial as described in any of the above (1) to (5) which contains 0.01 to 2% by mol of Mn in terms of MnO$_2$ by referring the total molar content of the metal elements, in terms of oxides, contained in the dielectric material as to 100% by mol.

(8) A dielectric material as described in any of the above (1) to (5) which contains 0.01 to 1% by mol of Mn in terms of MnO$_2$ by referring the total molar content of the metal elements, in terms of oxides, contained in the dielectric material as to 100% by mol.

(9) A dielectric material as described in any of the above (1) to (5) which contains 0.01 to 0.6% by mol of Mn in terms of MnO$_2$ by referring the total molar content of the metal elements, in terms of oxides, contained in the dielectric material as to 100% by mol.

(10) A dielectric material as described in any of the above (1) to (9) which contains 0.1 to 10% by mol of a rare earth element RE in terms of $RE_2O_3$ by referring the total molar content of the metal elements, in terms of oxides, contained in the dielectric material as to 100% by mol.

(11) A dielectric material as described in any of the above (1) to (9) which contains 0.1 to 8% by mol of a rare earth element RE in terms of $RE_2O_3$ by referring the total molar content of the metal elements, in terms of oxides, contained in the dielectric material as to 100% by mol.

(12) A dielectric material as described in any of the above (1) to (9) which contains 0.1 to 6% by mol of a rare earth element RE in terms of $RE_2O_3$ by referring the total molar content of the metal elements, in terms of oxides, contained in the dielectric material as to 100% by mol.

(13) A dielectric material as described in any of the above (10) to (12) wherein the rare earth element is at least one member selected from among La, Nd, Sm, Y and Yb.

(14) A dielectric material as described in any of the above (1) to (13) wherein less than 30% by mol of Ti is substituted by Zr and/or Sn by referring the total Ti content in the dielectric material as to 100% by mol.

(15) A dielectric material as described in any of the above (1) to (14) wherein less than 30% by mol of Al is substituted by at least one member selected from among Ga, Y and Yb by referring the total Al content in the dielectric material as to 100% by mol.

(16) A dielectric material as described in any of the above (1) to (15) wherein less than 30% by mol of $M^2$ is substituted by Sb by referring the total $M^2$ content in the dielectric material as to 100% by mol.

(17) An electronic component having a dielectric member made of a dielectric material as described in any of the above (1) to (16).

The dielectric material according to the invention can exert an $\in_r$ of about 45 to 65 and a sufficiently controlled absolute value of $\tau_f$ while sustaining well-balanced $\in_r$ and Qu. Thus, it is possible to achieve well-balanced dielectric characteristics in detail and appropriate dielectric characteristics can be selected depending on various purposes. In particular, the $\in_r$ can be highly selectively determined and, furthermore, a small absolute value of $\tau_f$ can be obtained while sustaining well-balanced $\in_r$ and Qu.

In the case where the Mn content is 5% by mol or less in terms of $MnO_2$, oxygen can be supplied during sintering almost regardless of the dielectric characteristics and thus aimed dielectric characteristics can be stably obtained.

In the case where the RE content is 10% by mol or less in terms of $RE_2O_3$, each of the dielectric characteristics can be controlled at a higher degree of freedom.

In the case where the RE is at least one member selected from among La, Nd, Sm Y and Yb, Qu and $\tau_f$ can be particularly improved while sustaining $\in_r$.

In the case where less than 30% by mol of Ti is substituted by Zr and/or Sn, each of the dielectric characteristics can be controlled within the neighborhood of the corresponding level of the unsubstituted composition so that desired combinations of dielectric characteristics can be obtained in greater detail. Thus, appropriate dielectric characteristics can be selected depending on various purposes. In the case of substituting Ti by Zr, in particular, the absolute value of $\tau_f$ can be lessened while little affecting $\in_r$ and Qu. In the case of substituting Ti by Sn, $\tau_f$ and Qu can be controlled in detail while little affecting $\in_r$.

In the case where less than 30% by mol of Al is substituted by at least one member selected form among Ga, Y and Yb, each of the dielectric characteristics can be controlled within the neighborhood of the corresponding level of the unsubstituted composition. In the case of substituting by Y and Yb, in particular, the absolute value of $\tau_f$ can be lessened.

In the case where less than 30% by mol of $M^2$ is substituted by Sb, the degree of sintering can be particularly improved and desired dielectric characteristics can be stably obtained.

The electronic component according to the invention can exhibit an $\in_r$ of about 45 to 65 and a sufficiently lessened $\tau_f$ while sustaining well-balanced $\in_r$ and Qu. Thus, it is possible to obtain an electronic component having well-balanced dielectric characteristics in detail. In particular, the $\in_r$ can be highly selectively determined and, furthermore, an $\tau_f$ can be obtained while sustaining well-balanced $\in_r$ and Qu.

ILLUSTRATION OF NUMERICAL SYMBOLS

1: dielectric resonator, 11: dielectric part, 12: casing, 2: duplexer, 21: dielectric part, 211: resonator (through hole), 212: excitation hole (through hole), 22: conductor.

DETAILED DESCRIPTION OF THE INVENTION

Now, the invention will be illustrated in greater detail.

The dielectric material according to the invention is a dielectric material containing Ca, Ti, Al, Nb and O, wherein these elements fulfill the following requirements when represented by a compositional formula $[aM^1O\text{-}bTiO_2\text{-}(\frac{1}{2})cAl_2O_3\text{-}(\frac{1}{2})dM^2{}_2O_5]$ (wherein a, b, c and d represent each a molar ratio, provided that a+b+c+d=1): $0.436 < a \leq 0.500$; $0.124 < b \leq 0.325$; $0.054 < c \leq 0.150$; and $0.170 < d < 0.346$. Hereinafter, this compositional formula will be referred to as the compositional formula [1].

In the above formula, [$M^1$] represents at least one of Ca and Sr. In the case where $M^1$ is Ca alone, therefore, the compositional formula [1] is $[aCaO\text{-}bTiO_2\text{-}(\frac{1}{2})cAl_2O_3\text{-}(\frac{1}{2})dM^2{}_2O_5]$. In the case where $M^1$ is Sr alone, therefore, the compositional formula [1] is $[aSrO\text{-}bTiO_2\text{-}(\frac{1}{2})cAl_2O_3\text{-}(\frac{1}{2})dM^2{}_2O_5]$. In the case where $M^1$ comprises both of Ca and Sr, therefore, the compositional formula [1] is $[a(Ca_{1-x}Sr_x)O\text{-}bTiO_2\text{-}(\frac{1}{2})cAl_2O_3\text{-}(\frac{1}{2})dM^2{}_2O_5]$, provided that $0 < x < 1$.

That is to say, $M^1$ may be either "Ca alone", "both of Ca and Sr" or "Sr alone". Ca and Sr can be substituted at an arbitrary ratio. In the case where $M^1$ comprises both of Ca and Sr, the range of x is not particularly restricted. For example, x maybe set as $0.01 \leq x \leq 0.5$, more specifically $0.01 \leq x \leq 0.3$, still specifically $0.01 \leq x \leq 0.1$.

In the above formula, "a" represents the molar ratio of $M^1O$ in the compositional formula [1]. a is set as $0.436<a\leq0.500$, preferably as $0.444<a\leq0.500$ and still preferably as $0.451<a\leq0.500$. When a falls within this range, a particularly large Qu can be obtained while maintaining $\in_r$ at an appropriate level.

In the above formula, "b" represents the molar ratio of $TiO_2$ in the compositional formula [1]. b is set as $0.124<b\leq0.325$, preferably as $0.124<b\leq0.300$ and still preferably as $0.133<b\leq0.275$ and particularly preferably as $0.141<b\leq0.275$. When b falls within this range, the absolute value of $\tau_f$ can be particularly lessened while maintaining $\in_r$ at an appropriate level.

A part of Ti may be substituted by Zr and/or Sn. In the case where Ti is partly substituted by Zr alone, the compositional formula [1] is $[aM^1O-b(Ti_{1-\alpha}Zr_\alpha)O_2-(\frac{1}{2})cAl_2O_3-(\frac{1}{2})dM^2{}_2O_5]$. In the case where Ti is substituted by Sn alone, the compositional formula [1] is $[aM^1O-b(Ti_{1-\beta}Sn_\beta)O_2-(\frac{1}{2})cAl_2O_3-(\frac{1}{2})dM^2{}_2O_5]$. $[aSrO-bTiO_2-(\frac{1}{2})cAl_2O_3-(\frac{1}{2})dM^2{}_2O_5]$. In the case where Ti is substituted by both Zr and Sn, the compositional formula [1] is $[aM^1O-b(Ti_{1-\alpha-\beta}Zr_\alpha Sn_\beta)O_2-(\frac{1}{2})cAl_2O_3-(\frac{1}{2})dM^2{}_2O_5]$.

Although the amount of Ti substituted by Zr and/or Sn is not particularly restricted, it is preferable that less than 30% by mol (still preferably 0.01 to 10% by mol and particularly preferably 0.01 to 5% by mol) of Ti is substituted by referring the total Ti content in the dielectric material as to 100% by mol. That is, $0<\alpha<0.3$ is preferable (still preferably $0.01\leq\alpha\leq0.1$ and particularly preferably $0.01\leq\alpha\leq0.05$) in the case $\beta=0$. In the case $\alpha=0$, $0<\beta0.3$ is preferable (still preferably $0.01\leq\beta\leq0.1$ and particularly preferably $0.01\leq\beta\leq0.05$). In the case $\alpha\neq0$ and $\beta\neq0$, $0<\alpha+\beta<0.3$ is preferable (still preferably $0.01\leq\alpha+\beta\leq0.1$ and particularly preferably $0.01\leq\alpha+\beta\leq0.05$). Within the ranges as specified above, each of the dielectric characteristics can be controlled within the neighborhood of the corresponding level of the unsubstituted composition. In the case of substituting Ti by Zr, for example, the absolute value of $\tau_f$ can be lessened while little affecting $\in_r$ and Qu. In the case of substituting Ti by Sn, the absolute value of $\tau_f$ can be lessened or Qu can be improved while little affecting $\in_r$. Thus, dielectric characteristics can be controlled in detail.

In the above formula, "c" represents the molar ratio of $Al_2O_3$ in the compositional formula [1]. c is set as $0.054<c\leq0.150$, preferably as $0.062<c\leq0.150$, and still preferably as $0.069<c\leq0.150$, still preferably as $0.075<c\leq0.150$ and particularly preferably as $0.079<c\leq0.150$. When c falls within this range, the absolute value of $\tau_f$ can be regulated to particularly small while maintaining $\in_r$ at an appropriate level.

Al may be partly substituted by at lease one of Ga, Y and Yb. In the case where Al is substituted by such element(s), the compositional formula [1] is expressed as in the above-described case of Ti. Although the amount of Al substituted by Ga, Y and Yb is not particularly restricted, it is preferable that less than 30% by mol (still preferably 0.01 to 10% by mol and particularly preferably 0.01 to 5% by mol) of Al is substituted by referring the total Al content in the dielectric material as to 100% by mol. Within the ranges as specified above, each of the dielectric characteristics can be controlled within the neighborhood of the corresponding level of the unsubstituted composition. In the case of substituting by Y and Yb, in particular, the absolute value of $\tau_f$ can be lessened.

In the above formula, $[M^2]$ represents at least one of Nb and Ta. In the case where $M^2$ is Nb alone, therefore, the compositional formula [1] is $[aM^1O-bTiO_2-(\frac{1}{2})cAl_2O_3-(\frac{1}{2})dNb_2O_5]$. In the case where $M^1$ is Ta alone, therefore, the compositional formula [1] is $[aM^1O-bTiO_2-(\frac{1}{2})cAl_2O_3-(\frac{1}{2})dTa_2O_5]$. In the case where $M^2$ comprises both of Nb and Ta, therefore, the compositional formula [1] is $[aM^1O-bTiO_2-(\frac{1}{2})cAl_2O_3-(\frac{1}{2})d(Nb_{1-y}Ta_y)_2O_5]$, provided that $0<y<1$.

That is to say, $M^2$ may be either "Nb alone", "both of Nb and Ta" or "Ta alone". Among these cases, however, "Nb alone" or "both of Nb and Ta" is preferred. In these cases, Qu can be elevated while maintaining $\in_r$ at an appropriate level and, furthermore, $\tau_f$ can be easily controlled within an appropriate range. In the case where $M^2$ comprises both of Nb and Ta, the range of y is not particularly restricted. For example, y may be set as $0.01\leq y\leq0.5$, more specifically $0.01\leq y\leq0.3$, still specifically $0.05\leq y\leq0.2$. When y falls within this range, Qu can be elevated while regulating effects on $\in_r$ and the absolute value of $\tau_f$ can be lessened.

In the above formula, "d" represents the molar ratio of $M^2{}_2O_5$ in the compositional formula [1]. d is set as $0.170<d<0.346$, preferably as $0.170<d\leq0.323$ and still preferably as $0.170<d\leq0.300$. When d falls within this range, a particularly large $\in_r$ can be obtained while maintaining Qu at an appropriate level.

$M^2$ may be partly substituted by at Sb. In the case where $M^2$ is substituted, the compositional formula [1] is expressed as in the above-described case of Ti. Although the amount of $M^2$ substituted is not particularly restricted, it is preferable that less than 30% by mol (still preferably 0.01 to 20% by mol and particularly preferably 0.01 to 10% by mol) of $M^2$ is substituted by referring the total $M^2$ content in the dielectric material as to 100% by mol. Within the ranges as specified above, the degree of sintering can be improved and, as a result, desired dielectric characteristics can be stably obtained.

The preferable ranges of a to d as specified above may be combined with each other. For example, the following combinations are available: $0.436<a\leq0.500$, $0.124<b\leq0.300$, $0.062<c\leq0.150$ and $0.170<d<0.346$; $0.436<a\leq0.500$, $0.124<b\leq0.275$, $0.069<c\leq0.150$ and $0.170<d\leq0.346$; $0.444<a\leq0.500$, $0.133<b\leq0.275$, $0.075<c\leq0.150$ and $0.170<d\leq0.323$; and, in particular, $0.451<a\leq0.500$, $0.141<b\leq0.275$, $0.079<c\leq0.150$ and $0.170<d\leq0.300$. Within these ranges, a large Qu can be obtained while maintaining $\in_r$ at an appropriate level and lessening the absolute value of $\tau_f$. Namely, it is possible to obtain, for example, $\in_r$ of 45 or more (usually not greater than 65), $Quxf_D$ of 10000 GHz or more and $\tau_f$ of $-15$ to $+15$ ppm/° C.

Although the crystalline phase contained in the dielectric material is not particularly restricted, it is preferable that the crystalline phase is a crystalline phase of the perovskite structure having a major crystalline phase represented by a compositional formula $[M^1(Al_\kappa M^2{}_\kappa Ti_{1-2\kappa})O_3]$ (wherein $0.175\leq\kappa\leq0.3$). It may further have a minor crystalline phase, though having no minor crystalline phase is preferred. That is to say, it is preferred that the major crystalline phase has a solid solution of an element which is not involved in the above compositional formula.

In addition to the composition represented by the compositional formula [1], the dielectric material may further contain a transition metal oxide (including a multiple oxide), an oxide containing at least one of B, Si, Ga, In, Sn, Sb, Pb and Bi (including a multiple oxide). The oxidation value (valency) of such an element in the dielectric material is not particularly restricted. Examples of the transition metal element as cited above include Mn, V, Cr. Fe, Co, Ni, Cu, Zn, Zr, Mo, Hf and W. Among the transition metal elements and other elements as cited above, transition metal elements are preferred. Among them, Mn, Fe, Co, Ni and Cu are still preferred and Mn is particularly preferred. Either one of these transition metal elements or two or more thereof may be used. Mn particularly contributes to improvements in dielectric characteristics. Although the content of the oxide(s) is not particularly restricted, it is preferable that the total content of the oxides of these elements is 5% by mol or less (still preferably 2% by mol or less, still preferably 1% by mol or less and particularly preferably 0.6% by mol or less and usually 0.01% by mol or more when contained) referring the whole dielectric material as to 100% by mol. Within this range, a large Qu can be easily maintained. Such an oxide may be contained for any reason. For example, it may be derived from an oxide employed as an oxygen donor during the production.

In calculating in terms of oxides, these elements are referred as respectively to $MnO_2$, $V_2O_5$, $Cr_2O_3$, $Fe_2O_3$, CoO, NiO, CuO, ZnO, $ZrO_2$, $MoO_3$, $HfO_2$, $WO_3$, $B_2O_3$, $SiO_2$, $Ga_2O_3$, $In_2O_3$, $SnO_2$, $Sb_2O_3$, $PbO_2$ and $Bi_2O_3$.

In addition to the composition represented by the compositional formula [1], the dielectric material may further contain a rare earth metal (RE) oxide (including a multiple oxide). Owing to the presence of RE, each of the dielectric characteristics can be controlled at a greater degree of freedom. The oxidation value (valency) of such an element in the dielectric material is not particularly restricted. Examples of the RE as cited above include La, Nd, Sm, Y, Yb, Sc, Ce, Pr, Pm, Eu, Gd, Tb, Dy, Ho, Er, Tm, Yb and Lu. Among them, La, Nd, Sm, Y and Yb are preferred. Either one of these REs or two or more thereof may be used. Although the content of the oxide(s) is not particularly restricted, it is preferable that the total content of RE (in terms of $RE_2O_3$) is 10% by mol or less (still preferably 8% by mol or less and still preferably 6% by mol or less and usually 0.1% by mol or more when contained) referring the whole dielectric material as to 100% by mol. Within this range, a large Qu and a small absolute value of $\tau_f$ can be obtained while maintaining $\in_r$ at an appropriate level.

The dielectric material represented by the compositional formula [1] can be regarded as a dielectric material which comprises solid solutions of three types of multiple oxides, i.e., $M^1TiO_3$, $M^1(Al_{0.5}M^2_{0.5})O_3$ and $M^1M^2_2O_6$ in each other. That is to say, it can be represented by a compositional formula $[rM^1TiO_3\text{-}sM^1(Al_{0.5}M^2_{0.5})O_3\text{-}tM^1_{1/3}M^2_{2/3}O_{6/3}]$ (wherein $M^1$ is Ca and/or Sr; $M^2$ is Nb and/or Ta; and r, s and t represent each a molar ratio, provided that r+s+t=1) (Hereinafter, this compositional formula will be referred to as the compositional formula [2].)

Figure 5:
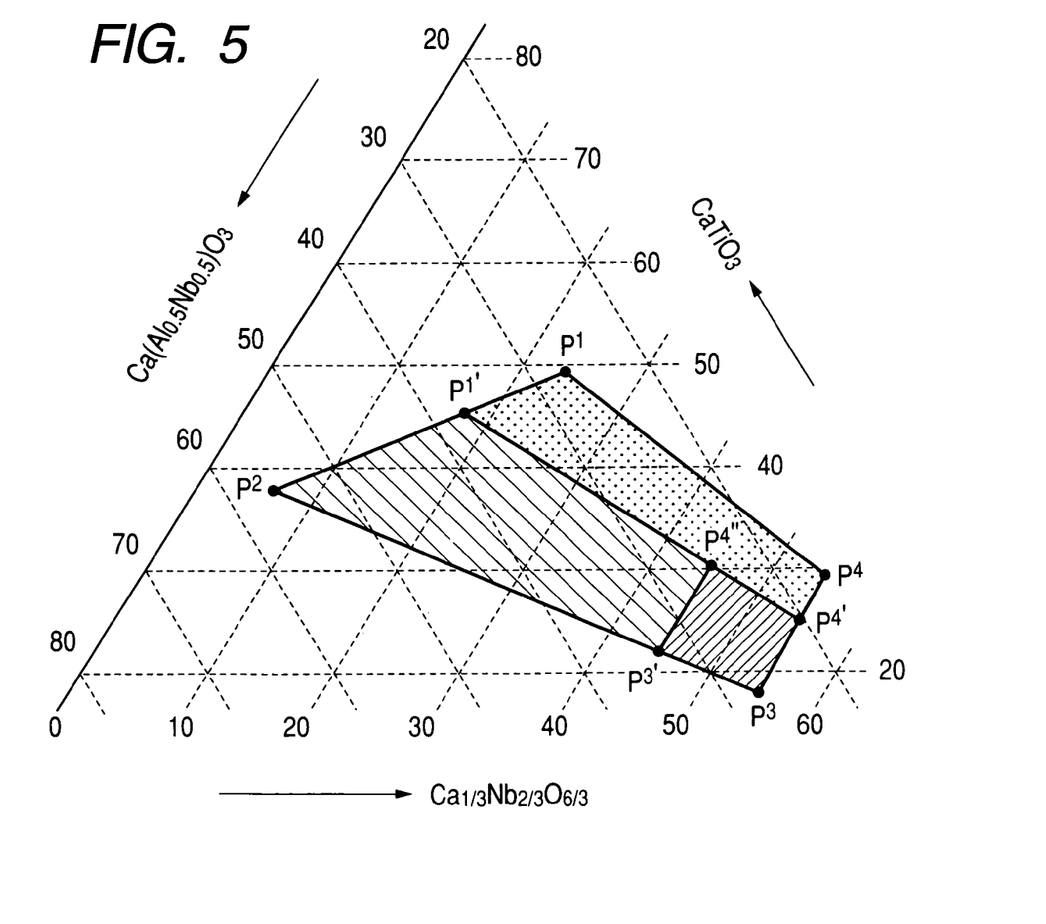
FIG. 5 is a ternary diagram showing the correlationship among s, t and r in the case of represented the dielectric material according to the invention by the compositional formula [2].

In the case where the correlationship among r, s and t in this compositional formula [2] is expressed in a ternary diagram, it is preferable that points corresponding respectively to r, s and t are located in the area excluding the side $P^1P^2$ in the quadrangle having apexes $P^1P^2P^3P^4$ in FIG. 5. It is still preferable that r, s and t are located in the area excluding the side $P^1P^2$ in the quadrangle having apexes $P^1P^2P^{3'}P^{4'}$ and particularly preferably in the area excluding the side $P^1P^2$ in the quadrangle having apexes $P^1P^2P^{3''}P^{4''}$, provided that the points (r, s, t) are specified as follows.

$P^1$; (0.4879, 0.2627, 0.2494)
$P^2$; (0.3702, 0.5553, 0.0745)
$P^3$; (0.18, 0.27, 0.55)
$P^4$; (0.2925, 0.1575, 0.55)
$P^{1'}$; (0.4466, 0.3654, 0.1880)
$P^{3'}$; (0.22, 0.33, 0.45)
$P^{4'}$; (0.2475, 0.2025, 0.55)
$P^{4''}$; (0.3025, 0.2475, 0.45)

Within these areas, characteristics with a smaller absolute value of $\tau_f$ can be obtained. It is seemingly preferable that the composition contains $M^1M^2_2O_6$ (expressed as $M^1_{1/3}M^2_{2/3}O_{6/3}$ in the compositional formula [2]) among the multiple oxides as described above. This is because the presence of $M^1M^2_2O_6$ would elevate $\in_r$ to a desired level while maintaining other dielectric characteristics such as Qu and $\tau_f$ each at an appropriate level In the dielectric material according to the invention, $\in_r$ can be set as 45 to 63 (more specifically 48 to 60 and still specifically 50 to 58, in particular, 53 to 58). It is also possible to set the product of Qu and resonance frequency $f_0$ (Qu×$f_0$) as 10000 GHz or more (more specifically 11000 GHz or more, still specifically 12000 GHz or more, in particular, 12500 GHz or more). It is also possible to set the temperature factor ($\tau_f$) of resonance frequency as −15 to +15 ppm/° C. (more specifically −12 to +12 ppm/° C., further more preferably −10 to +10 ppm/° C., and still further more preferably, −5 to +5 ppm/° C.)

In the case where it is desired to obtain a particularly large $\in_r$ while maintaining favorable balance with other dielectric characteristics, for example, use may be made of a combination $0.444 \leq a \leq 0.462$, $0.133 \leq b \leq 0.173$, $0.096 \leq c \leq 0.108$ and $0.261 \leq d \leq 0.323$. Thus, it is possible to control $\in_r$ to 53 to 59, Qu×$f_0$ to 10000 to 13000 GHz and $\tau_f$ to 0 to 15 ppm/° C.

In the case where it is desired to obtain a particularly large Qu while maintaining favorable balance with other dielectric characteristics, for example, use may be made of a combination $0.458 \leq a \leq 0.487$, $0.124 \leq b \leq 0.217$, $0.117 \leq c \leq 0.129$ and $0.175 \leq d \leq 0.292$. Thus, it is possible to control $\in_r$ to 47 to 53, Qu×$f_0$ to 12500 to 15000 GHz and $\tau_f$ to −15 to 0 ppm/° C.

In the case where it is desired to obtain a particularly small absolute value of $\tau_f$ while maintaining favorable balance with other dielectric characteristics, for example, use may be made of a combination $0.432 \leq a \leq 0.487$, $0.144 \leq b \leq 0.223$, $0.101 \leq c \leq 0.139$ and $0.175 \leq d \leq 0.323$. Thus, it is possible to control $\in_r$ to 48 to 58, Qu×$f_0$ to 9000 to 15000 GHz and $\tau_f$ to −4 to 4 ppm/° C.

That is to say, the dielectric characteristics can be controlled over a wide range depending on the purpose to give well-balanced dielectric characteristics in greater detail. Namely, dielectric characteristics appropriate for various purposes can be selected.

[2] Method of Producing Dielectric Material

The dielectric material according to the invention may be produced by an arbitrary method without particular restriction. For example, it can be obtained by heating a starting composition containing $M^1$, Al, Ti and $M^2$ each in such an amount as to give the molar ratios of $M^1$, Al, Ti and $M^2$ as specified in the compositional formula [1].

To obtain a dielectric material containing the above-described elements available as substitutes for $M^1$, Al, Ti and $M^2$, it can be obtained by heating a starting composition containing $M^1$, Al, Ti, $M^2$ and the elements available as the substitute therefor each in such an amount as to give the molar ratios of $M^1$, Al, Ti, $M^2$ and the elements available as the substitute therefor as specified in the compositional formula [1].

To obtain a dielectric material containing side components such as Mn and RE in addition to the compositional formula [1], it can be obtained by heating a starting composition containing $M^1$, Al, Ti and $M^2$ each in such an amount as to give the molar ratios of $M^1$, Al, Ti and $M^2$ and the elements constituting the side components each in such an amount as to fulfill the requirement as specified above.

The starting composition may be a mixture of materials individually containing the elements. Alternatively, it may be a mixture of multiple oxides each containing plural elements.

Examples of the materials individually containing the elements as described above include Ca compounds, Sr compounds, Al compounds, Ti compounds, Nb compounds, Ta compounds, Zr compounds, Sn compounds, Y compounds, Yb compounds, Sb compounds and other RE compounds. Furthermore, each of these compounds may be in the form of an oxide of the corresponding element or a compound which can be converted into an oxide by heating, Such compounds which can be converted into oxides by heating is not particularly restricted in type. For example, carbonates, hydroxides, hydrgencarbonates, nitrates and organic metal compounds may be cited. Either one of these oxides and compounds which can be converted into oxides by heating or a mixture of two or more thereof may be employed. These materials are not particularly restricted in form. Namely, use may be made of, for example, powdery materials, and liquid materials. Examples of the multiple oxides containing plural elements include $CaTiO_3$, $SrTiO_3$, $(Ca_{0.5}Sr_{0.5})TiO_3$, $Ca(Al_{0.5}Nb_{0.5})TiO_3$, $Ca(Al_{0.5}Ta_{0.5})TiO_3$, $Ca(Al_{1/2}Nb_{1/4}Ta_{1/4})TiO_3$, $CaNb_2O_6$, $CaTa_2O_6$ and $Ca(Nb_{0.5}Ta_{0.5})_2O_6$. Either one of these multiple oxides or a mixture of two or more thereof may be used. Moreover, it may be used either with of without the materials as described above.

The "heating" treatment as described above may be carried out under arbitrary conditions without particular restriction, so long as the dielectric material can be obtained thereby. Namely, the heating treatment may be carried out in one step (i.e., sintering alone) or two steps (i.e., calcining and sintering). In the case of the two-step heating, the procedures may be performed either continuously or discontinuously.

The sintering step (the second heating step in the case of the two step heating) is a step in which a molded article containing a starting composition (calcined components in the case of the two step heating) to be converted into a dielectric material is sintered. Although the sintering temperature in the sintering step is not particularly restricted, it may be controlled to, for example, 1100 to 1700° C. (preferably 1300 to 1600° C.). In the case where the sintering temperature falls within this range, the molded article can be sufficiently sintered and densified. The sintering time may be controlled to 1 hour or longer (usually not exceeding 100 hours), though the invention is not restricted thereto.

Moreover, the sintering atmosphere is not particularly restricted. Namely, either an oxidative atmosphere or a non-oxidative atmosphere may be employed. As an example of the oxidative atmosphere, atmospheric air may be cited. The term "non-oxidative atmosphere" means an atmosphere having a low oxygen pressure, i.e., an atmosphere in which the oxygen pressure is maintained usually at 10 Pa or lower (preferably 0.1 Pa or lower and usually higher than 0.0001 Pa). Such a non-oxidative atmosphere may be constituted by any gases without restriction. Examples of such gases include inert gases such as nitrogen and rare gases such as argon. The sintering atmosphere may be either a humid atmosphere or a non-humid atmosphere. The term "humid atmosphere" means an atmosphere under dew point control in which the due point is maintained usually at 90° C. or lower (preferably 80° C. or lower and usually 30° C. or higher). The sintering may be carried out either under or without pressurizing.

The calcining step (the first heating step in the case of the two step heating) is a step in which a starting composition is sintered to give a calcined product. In the case where a starting composition is prepared by mixing and molded and the molded article is directly sintered without calcining, it is impossible in some cases to sufficiently sinter the molded article in the subsequent sintering step. By calcining, in contrast thereto, the starting composition undergoes a reaction to form aimed compounds and, as a result, the sintering temperature in the subsequent sintering step can be effectively lowered.

Although the calcining temperature in the calcining step is not particularly restricted, it may be controlled to, for example, 600 to 1400° C. (preferably 800 to 1300° C.). In the case where the calcining temperature falls within this range, the starting components scarcely remain unreacted or the starting composition would not be sintered to give a calcined product which can be hardly ground. The calcining time in this calcining step may be controlled to 1 hour or longer (usually not exceeding 20 hours), though the invention is not restricted thereto. Moreover, the calcining atmosphere is not particularly restricted and various atmospheres may be used as in the sintering atmosphere as described above. The calcining atmosphere may be the same as the sintering temperature or different therefrom.

These heating conditions maybe combined in various ways. For example, a dielectric material can be obtained by mixing materials containing individual elements, calcining the obtained mixture in the atmospheric air at 600 to 1400° C. (preferably 800 to 1300° C.) for 1 to 20 hours, then grinding the calcined product, molding and sintering in the atmospheric air at 1100 to 1700° C. (preferably 1300 to 1600° C.) for 1 to 100 hours.

In addition to the heating step(s) as described above, the production method according to the invention may further contain other step(s). Examples of the other steps include (1) a granulation step of grinding the calcined product and granulating the calcined powder thus obtained, and (2) a molding step of molding the granulated powder obtained in the above step (1) to give a molded article.

The granulation step is a step in which the calcined product obtained by calcining is ground and, after adding, for example, a binder, a solvent, a plasticizer and a dispersant, the calcined powder is granulated to give granules suitable for molding. The granulation method is not particularly restricted and use may be made of, for example, the spray drying method. The molding step is a step in which the granulated powder obtained in the granulation step is molded to give a molded article. In this step, the granulated powder is usually blended with, for example, a binder, a solvent, a plasticizer and a dispersant to impart moldability thereto. The molding method is not particularly restricted and use may be made of various methods such as uniaxial pressing and cold isotropic/isostatic pressing (hereinafter referred to simply as CIP) therefor.

[3] Electronic Component

The electronic component according to the invention is characterized by having a dielectric part made of the dielectric material.

The "dielectric part" as described above is made of the dielectric material according to the invention and not restricted in shape or size. This dielectric part is usable as a ceramic part of, for example, a filter, a duplexer, a resonator, an LC device, a coupler, a diplexer, a diode, a dielectric antenna, a ceramic condenser, a circuit board and a package. Namely, it is preferably made into a shape and size appropriate for the purpose.

The electronic component may have other part(s) in addition to the dielectric part. As an example of the other parts, a conductor part may be cited. A conductor part usually means a part having electrical conductivity which is formed on the surface and/or inside of the dielectric part. This conductor part may be either sintered simultaneously with the dielectric part or separately sintered. Conductor materials constituting the conductor part are not particularly restricted. For example, use may be made of Ag, Cu, Au, Ni, Al, W, Ti, V, Cr, Mn, Mo, Pd, Pb, Ru, Rh and Ir therefor. Either one of these materials or two or more thereof may be employed.

As an example of the electronic component according to the invention, a dielectric resonator having a cylindrical dielectric part made of the dielectric material according to the invention may be cited.

Other examples thereof include a duplexer and a dielectric filter each provided with a dielectric part which is in a rectangular shape and has a plural number of aligned through holes and a conductor part covering the definite external face of the dielectric part and the inner part of the through holes.

Another example thereof is a layered dielectric chip antenna having a plural number of dielectric parts in the form of thin plates layered together, conductor patterns formed among the dielectric parts and a through hole conductor or an external face conductor electrically connecting the conductor patterns.

Still another example thereof is a dielectric hip antenna having a rectangular dielectric part, a power supplying electrode located at one end in the longitudinal direction of the dielectric part, a fixed electrode located at the other end and a radiation electrode spirally wound around the side wall of the dielectric part with one end being connected to the power supplying electrode while the other end being free.

Further examples thereof include an LC filter, a ceramic condenser and a ceramic circuit board each having a plural number of dielectric parts in the form of thin plates layered together, conductor patterns formed among the dielectric parts and a through hole conductor or an external face conductor electrically connecting the conductor patterns.

EXAMPLES

Now, the invention will be illustrated in greater detail by referring to the following examples.

(1) Production of Dielectric Material

Commercially available powders of $CaCO_3$, $SrCO_3$, $TiO_2$, $Al_2O_3$, $Nb_2O_5$, $Ta_2O_5$, $MnO_2$, $RE_2O_3$, $ZrO_2$, $SnO_2$, $Ga_2O_3$ and $Sb_2O_5$ were weighed so as to give each combination of the values a to d, in terms of oxides, in the compositional formula [1] as specified in Table 1. Then these powders (starting materials) were wet-mixed with the use of ethanol as a solvent to give a powdery mixture (a starting composition). This powdery mixture was calcined in the atmospheric air at 1200° C. for 2 hours. Next, a dispersant, a binder and ethanol were added to this calcined product and the mixture was ground in a ball mill to give a slurry. Then this slurry was dried and granulated to give a granular powder. This granular powder was molded into columns by uniaxially pressing under pressure of 20 MPa. Subsequently, the molded article was subjected to CIP (cold isotropic/isostatic press) treatment under pressure of 150 MPa, maintained at 500° C. for 3 hours and then sintered. Thus, dielectric materials made of the dielectric materials of Experimental Examples 1 to 49 were obtained.

TABLE 1

| | aCaO-bTiO$_2$-(1/2) cAl$_2$O$_3$-(1/2) dNb$_2$O$_5$ | | | | MnO$_2$ | RE$_2$O$_3$ | | | Qu × f$_0$ | τ$_f$ |
|---|---|---|---|---|---|---|---|---|---|---|
| | a | b | c | d | (mol %) | (mol %) | RE | ε$_r$ | (GHz) | (ppm/K) |
| 1 | 0.4815 | 0.2222 | 0.1111 | 0.1852 | 0.3884 | — | — | 54 | 12400 | 12 |
| *2 | 0.4286 | 0.1429 | 0.0714 | 0.3571 | 0.3485 | | | 68 | 2600 | 65 |
| 3 | 0.4815 | 0.2133 | 0.1156 | 0.1896 | 0.3889 | | | 52 | 12800 | 4 |
| 4 | 0.4865 | 0.2162 | 0.1216 | 0.1757 | 0.3942 | | | 50 | 14200 | −2 |
| 5 | 0.4815 | 0.1944 | 0.1250 | 0.1991 | 0.3901 | | | 49 | 13400 | −10 |
| 6 | 0.4706 | 0.1765 | 0.1176 | 0.2353 | 0.3801 | | | 52 | 12900 | −4 |
| 7 | 0.4583 | 0.1250 | 0.1250 | 0.2917 | 0.3718 | | | 48 | 13200 | −15 |
| 8 | 0.4865 | 0.2027 | 0.1284 | 0.1824 | 0.3951 | | | 48 | 14400 | −9 |
| 9 | 0.4706 | 0.2059 | 0.1029 | 0.2206 | 0.3784 | | | 56 | 12000 | 13 |
| 10 | 0.4646 | 0.1970 | 0.0985 | 0.2399 | 0.3734 | | | 58 | 11500 | 15 |
| 11 | 0.4646 | 0.1818 | 0.1061 | 0.2475 | 0.3743 | | | 55 | 12100 | 7 |
| 12 | 0.4762 | 0.2000 | 0.1143 | 0.2095 | 0.3842 | | | 52 | 13000 | 3 |
| 13 | 0.4583 | 0.1563 | 0.1094 | 0.2760 | 0.3701 | | | 53 | 12000 | 0 |
| 14 | 0.4516 | 0.1452 | 0.1048 | 0.2984 | 0.3652 | | | 54 | 11300 | 0 |
| 15 | 0.4516 | 0.1613 | 0.0968 | 0.2903 | 0.3643 | | | 58 | 10800 | 11 |
| 16 | 0.4444 | 0.1333 | 0.1000 | 0.3222 | 0.3602 | | | 54 | 10000 | 3 |

In Table 1, "*" means being excluded from the scope of the invention.

TABLE 2

| | aCaO-bTiO$_2$-(1/2) cAl$_2$O$_3$-(1/2) dNb$_2$O$_5$ | | | | MnO$_2$ | RE$_2$O$_3$ | | | Qu × f$_0$ | τ$_f$ |
|---|---|---|---|---|---|---|---|---|---|---|
| | a | b | c | d | (mol %) | (mol %) | RE | ε$_r$ | (GHz) | (ppm/K) |
| 17 | 0.4583 | 0.1719 | 0.1016 | 0.2682 | 0.3693 | — | — | 57 | 11300 | 10 |
| 18 | 0.4550 | 0.1505 | 0.1073 | 0.2872 | 0.3677 | | | 54 | 11700 | 0 |
| 19 | 0.4615 | 0.1692 | 0.1077 | 0.2615 | 0.3722 | | | 54 | 12000 | 4 |
| 20 | 0.4677 | 0.1791 | 0.1119 | 0.2413 | 0.3772 | | | 53 | 12600 | 0 |
| 21 | 0.4550 | 0.1667 | 0.0992 | 0.2791 | 0.3668 | | | 57 | 11100 | 11 |
| 22 | 0.4583 | 0.1641 | 0.1055 | 0.2721 | 0.3697 | | | 55 | 11800 | 6 |
| 23 | 0.4550 | 0.1587 | 0.1032 | 0.2831 | 0.3672 | | | 56 | 11500 | 6 |
| 24 | 0.4516 | 0.1532 | 0.1008 | 0.2944 | 0.3647 | | | 56 | 11000 | 11 |
| 25 | 0.4789 | 0.2254 | 0.1056 | 0.1901 | 0.3854 | | | 56 | 12500 | 15 |
| 26 | 0.4571 | 0.2286 | 0.1143 | 0.2000 | 0.3767 | 2.8571 | La | 54 | 12000 | 12 |
| 27 | 0.4444 | 0.2222 | 0.1389 | 0.1944 | 0.3767 | 5.5556 | La | 49 | 12900 | −2 |
| 28 | 0.4583 | 0.1719 | 0.1016 | 0.2682 | 0.3693 | 1.0000 | Sm | 55 | 11700 | 2 |
| 29 | 0.4444 | 0.2029 | 0.1304 | 0.2222 | 0.3725 | 4.3478 | La | 51 | 12300 | −1 |
| 30 | 0.4571 | 0.2286 | 0.1143 | 0.2000 | 0.3767 | 2.8571 | La/Nd | 54 | 12400 | 8 |
| 31 | 0.4571 | 0.2286 | 0.1143 | 0.2000 | 0.3767 | 2.8571 | La/Sm | 54 | 12400 | 9 |

TABLE 3

| | aCaO-bTiO$_2$-(1/2) cAl$_2$O$_3$-(1/2) dNb$_2$O$_5$ | | | | | | | | MnO$_2$ | | Qu × f$_0$ | τ$_f$ |
|---|---|---|---|---|---|---|---|---|---|---|---|---|
| | a | Ca substitution (%) | b | Ti substitution (%) | c | Al substitution (%) | d | Nb substitution (%) | (mol %) | ε$_r$ | (GHz) | (ppm/K) |
| 17 | 0.4583 | — | 0.1719 | — | 0.1016 | — | 0.2682 | — | 0.3693 | 57 | 11300 | 10 |
| 32 | 0.4583 | 2.5(Sr) | 0.1719 | — | 0.1016 | — | 0.2682 | — | 0.3693 | 58 | 11100 | 10 |
| 33 | | 5.0(Sr) | | | | | | | | 58 | 10600 | 13 |
| 34 | 0.4583 | — | 0.1719 | 2.5(Zr) | 0.1016 | — | 0.2682 | — | 0.3693 | 54 | 11300 | 2 |
| 35 | | | | 5.0(Zr) | | | | | | 56 | 11100 | 8 |
| 36 | | | | 2.5(Sn) | | | | | | 56 | 11700 | 2 |
| 37 | | | | 5.0(Sn) | | | | | | 53 | 11900 | −2 |
| 38 | 0.4789 | — | 0.2254 | 2.5(Sn) | 0.1056 | — | 0.1901 | — | 0.3854 | 55 | 12500 | 14 |
| 39 | | | | 5.0(Sn) | | | | | | 54 | 12500 | 9 |
| 40 | 0.4583 | — | 0.1719 | — | 0.1016 | 2.5(Y) | 0.2682 | — | 0.3693 | 55 | 11600 | 6 |
| 41 | | | | | | 5.0(Y) | | | | 55 | 11600 | 2 |
| 42 | | | | | | 2.5(Yb) | | | | 56 | 11600 | 6 |
| 43 | | | | | | 5.0(Yb) | | | | 55 | 10900 | 3 |
| 44 | | | | | | 2.5(Ga) | | | | 57 | 11300 | 10 |
| 45 | | | | | | 5.0(Ga) | | | | 58 | 11100 | 13 |
| 46 | 0.4583 | — | 0.1719 | — | 0.1016 | — | 0.2682 | 10(Ta) | 0.3693 | 56 | 11800 | 8 |
| 47 | | | | | | | | 20(Ta) | | 55 | 12500 | 6 |
| 48 | | | | | | | | 2.5(Sb) | | 54 | 10100 | 5 |
| 49 | | | | | | | | 5.0(Sb) | | 55 | 10300 | 7 |

In Experimental Example 32, for example, "a=0.4583" means the total molar ratio of CaO and SrO. That is, the above "CaCO$_3$" was substituted by "SrCO$_3$" so as to give an Sr content of 0.0115 (molar ratio) amounting to "2.5%" of the whole "a". The same applies to "Ti substitution", "Al substitution" and "Nb substitution".

(2) Measurement of Dielectric Characteristics

Surface of each of the obtained dielectric materials of Experimental Examples 1 to 49 was polished. Then, ε$_r$, Qu and τ$_f$ were measured by the parallel conductor board dielectric resonator method at a measuring frequency of 3 to 5 GHz. τ$_f$ was measured within a temperature range of from 25 to 80° C. Qu was evaluated as a product with resonance frequency F$_0$ (Quxf$_0$). Tables 1 to 3 summarize the results.

As Tables 1 to 3 show, a small Quxf$_0$ value (2600 GHz) and a large absolute value of τ$_f$(65) were observed in Experimental Example 2 wherein the lower limit of a was less than 0.436 and d exceeded 0.346.

In Experimental Examples 1 and 3 to 49 wherein a, b, c and d all fell within the scopes of the invention, in contrast, Quxf$_0$ values (10000 to 14400 GHz) were 3.8 to 5.5 times as high as that of Experimental Example 2, which indicates that excellent Qu values were obtained. Further, τ$_f$ values were controlled within a relatively narrow numerical range of −15 to +15 ppm/° C. and the absolute values thereof were smaller, i.e., 23% of the τ$_f$ in Experimental Example 2. In these Experimental Examples, ε$_r$ values stably fell within the aimed intermediate range of from 48 to 58. Namely, the ε$_r$ values could be widely controlled within this intermediate range. As these results indicate, well-balanced dielectric characteristics can be achieved in detail in these dielectric materials, which indicates that appropriate dielectric characteristics can be selected depending on various purposes.

In Experimental Examples 26 to 31, rare earth element oxides were employed as compositions other than the compositional formula [1]. It can be understood that, owing to this constitution, the absolute τ$_f$ value could be regulated at a small level (−2 to 12) while maintaining the ε$_r$ values stably within the aimed intermediate range of from 49 to 54 and maintaining the Quxf$_0$ products within a range of 11700 to 12900 GHz.

Moreover, Experimental Examples 17, 32 and 33 indicate that Ca could be substituted by Sr while scarcely affecting any dielectric characteristics. Experimental Examples 17 and 34 to 37 indicate that, by substituting Ti by Zr and/or Sn, $\tau_f$ could be elevated while little changing $\in_r$ and Qu. That is, it was observed that $\tau_f$ values were elevated by 20 to 80% (the absolute value approximating to 0) respectively by the substitution of 2.5 to 5.0%. Experimental Examples 17 and 40 to 43 indicate that, by substituting Al by Y and/or Yb, $\tau_f$ could be elevated while little changing $\in_r$ and Qu. That is, it was observed that $\tau_f$ values were elevated by 40 to 80% (the absolute value approximating to 0) respectively by the substitution of 2.5 to 5.0%. Experimental Examples 17, 44 and 45 indicate that, Al could be substituted by Ga while little affecting any dielectric characteristics. Experimental Examples 17 and 46 to 49 indicate that, by substituting Nb by Ta and Sb, $\tau_f$ could be elevated while little changing $\in_r$ and QU. That is, it was observed that $\tau_f$ values were elevated by 20 to 50% (the absolute value approximating to 0) respectively by the substitution of 2.5 to 5.0%.

(3) X-Ray Diffractometry

Figure 1:
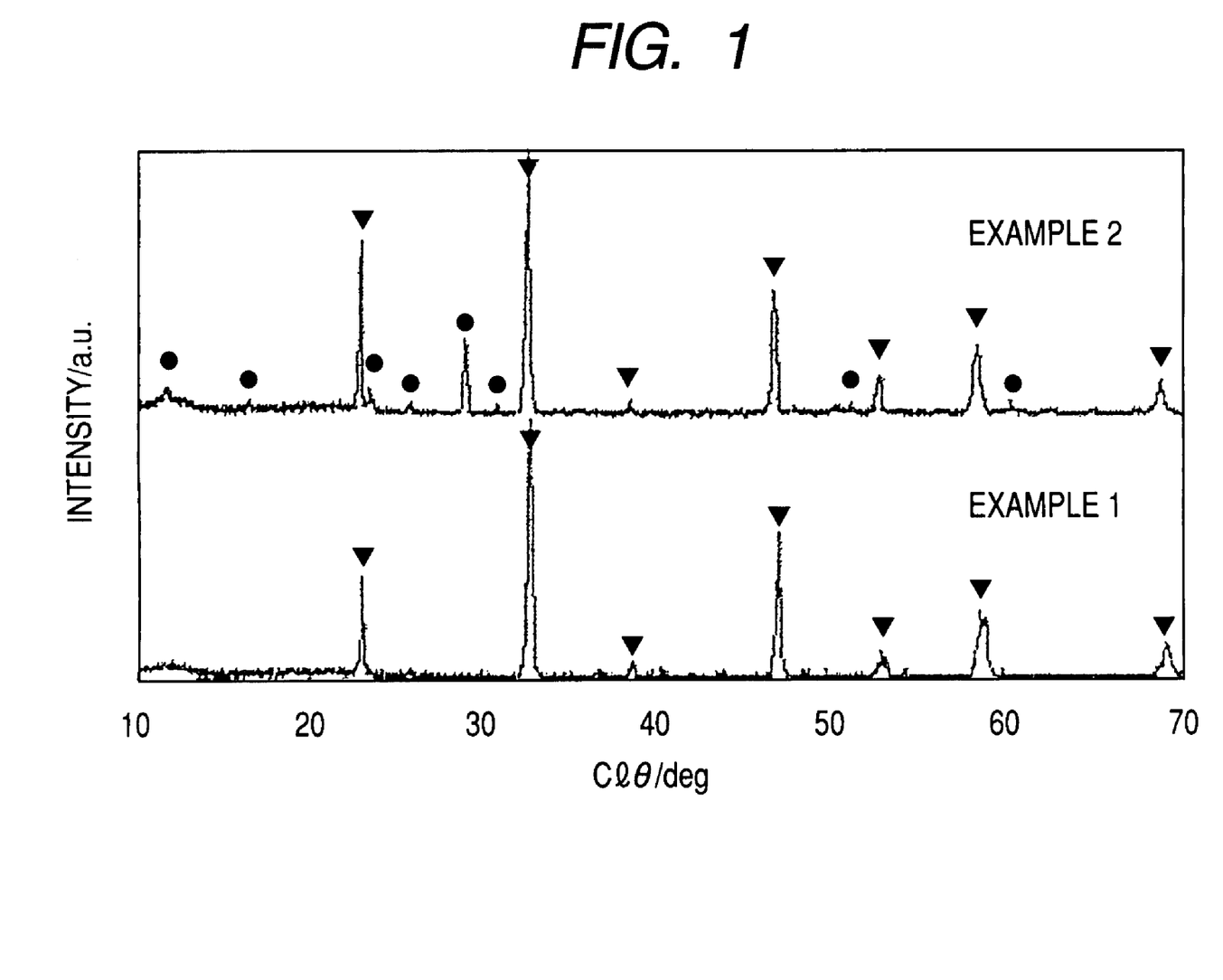
FIG. 1 presents charts showing the data obtained by X-ray diffractometry in Experimental Example 1 (lower chart) and Experimental Example 2 (upper chart).

The dielectric materials obtained by Experimental Example 1 (an invention product) and Experimental Example 2 (a comparative product) in the above (1) were analyzed by X-ray diffractometry. FIG. 1 shows the multiple diferactometric patterns of the results. In FIG. 1, the upper chart shows the data of Experimental Example 2 while the lower chart shows the data of Experimental Example 1.

When identified, peaks having solid inverted triangles in each chart are peaks of the major crystalline phase, indicating the formation of the perovskite structure. Peaks having solid circles in the upper chart mean the deposited minor crystalline phase which was proved as $CaNb_2O_6$. Based on these results, it is considered that in the dielectric material of Experimental Example 1, a solid solution of excessive components occurred in multiple oxides of the perovskite structure comprising $Ca(Al_\kappa Nb_\kappa Ti_{1-2\kappa})O_3$ as the base. On the other hand, Nb was contained in excess to Al and Ti in the dielectric material of Experimental Example 2 and thus $CaNb_2O_3$ was seemingly deposited as a separate phase. Although the $CaNb_2O_6$ contributed to the improvement in $\in_r$, it seems preferable that $CaNb_2O_6$ is not deposited as a separate phase but occurs as a solid solution.

Although peaks having solid inverted triangles in the lower chart are closely similar to the peaks of the major crystalline phase shown in the upper chart, broadening in the rising and shift of the peak position were observed in some peaks. Although the dielectric material contained materials in amounts exceeding the level required for the formation of the main crystalline phase alone, no peak other than the major crystalline phase was observed. These facts seemingly indicate that excessive components were in the state of a solid solution in the major crystalline phase in the lower chart.

Production of Resonator

Now, a case using the dielectric material as a dielectric resonator will be illustrated.

Figure 2:
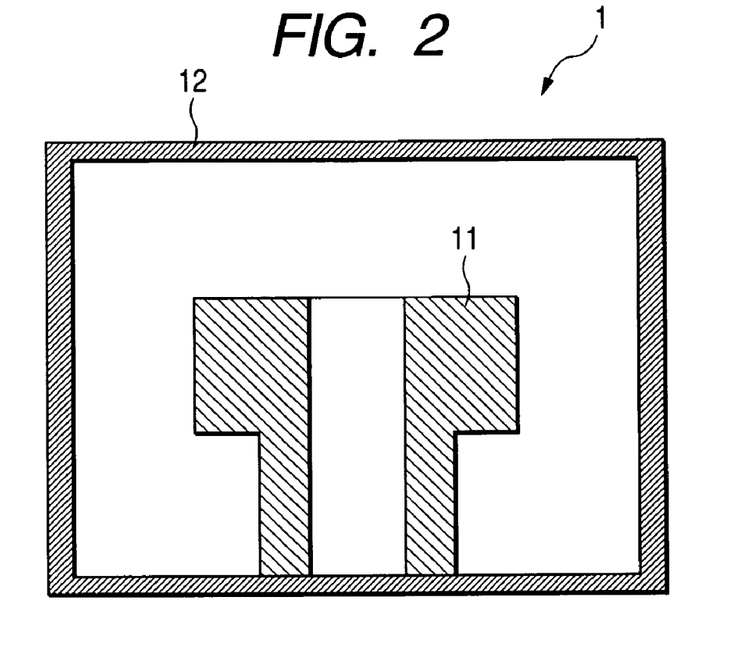
FIG. 2 is a model view showing the outline of a dielectric resonator which is an example of the electronic component according to the invention.

Using a granulated powder produced as in Experimental Example 1 in Table 1 as described in the above (1), a cylindrical unsintered molded article was produced by uniaxially pressing, The unsintered article thus obtained was sintered by maintaining in the atmospheric air at 1500° C. for 3 hours to give a dielectric part (11 in FIG. 2: dielectric part) composed of two cylinders having different outer diameter, i.e., one having an inner diameter of 6.8 nm and outer diameter at the upper part (height: 12 nm) of 26 mm being piled upon another having an outer diameter at the lower part (height: 13 mm) of 15 mm piled thereon. Next, the obtained dielectric part was fixed on the bottom of a metallic casing 12 to give a resonator 1.

Production of Duplexer

Now, a case using the dielectric material as a duplexer will be illustrated.

Using a granulated powder produced as in Experimental Example 1 in Table 1 as described in the above (1), a rectangular unsintered molded article (the same shape as 21 in FIGS. 3 and 4) having aligned through holes (211 and 212 in FIGS. 3 and 4) was produced by uniaxially pressing. The unsintered article thus obtained was sintered by maintaining in the atmospheric air at 1500° C. for 3 hours to give a dielectric part (21 in FIGS. 3 and 4). Next, a silver paste for conductor was printed and baked on the definite outer face (including the surface of the through holes) of the dielectric part to form a conductor 22, thereby giving a duplexer 2.

Figure 3:
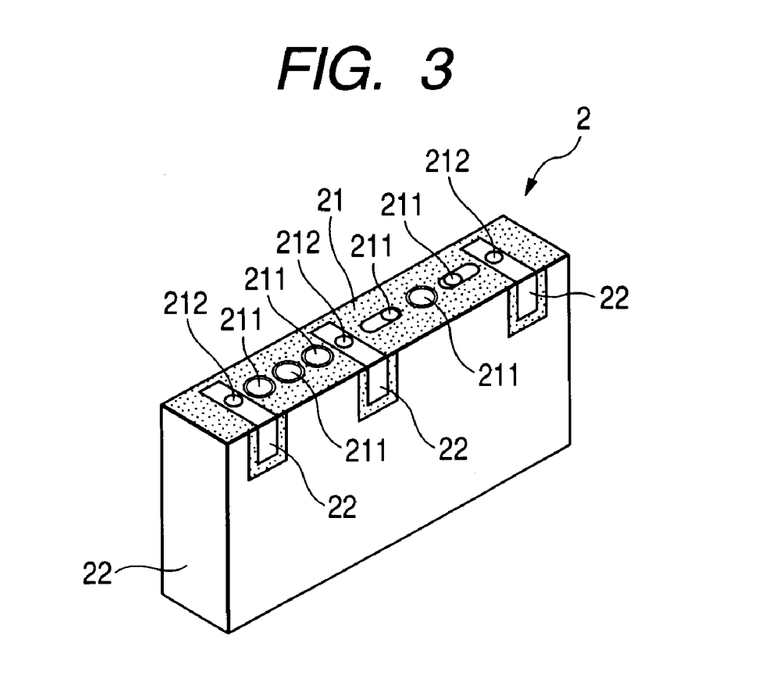
FIG. 3 is a perspective view showing the outline of a duplexer which is an example of the electronic component according to the invention.
Figure 4:
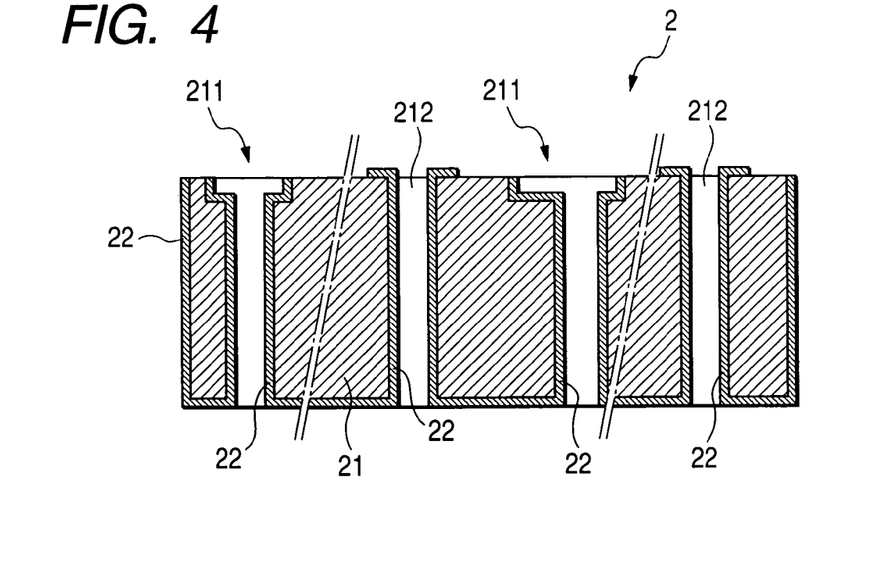
FIG. 4 is a sectional model view of the duplexer shown in FIG. 3.

Namely, the duplexer 2 has a rectangular dielectric part 21 having through holes aligned in parallel which serve resonators 211 or excitation holes 212 and a conductor part 22 covering the definite outer face (including the surface of the through holes) of the dielectric part 21 excluding the open end with the opening of the through holes.

The invention is not restricted to the specific embodiment examples as described above but various modifications can be made depending on the purposes and uses within the scope of the invention. Moreover, the dielectric material according to the invention may contain other component(s) and/or unavoidable contaminant(s) so long as the dielectric characteristics of the dielectric material are not substantially affected thereby.

The following Table 4 shows r, s and t values of the dielectric materials of Experimental Examples 1 to 49 represented by the compositional formula [2] as described above.

TABLE 4

| | $rM^1TiO_3$-$sM^1(Al_{0.5}M^2_{0.5})O_3$-$tM^1_{1/3}M^2_{2/3}O_{8/3}$ | | |
|---|---|---|---|
| | r | s | t |
| 1 | 0.4000 | 0.4000 | 0.2000 |
| *2 | 0.2000 | 0.2000 | 0.6000 |
| 3 | 0.3840 | 0.4160 | 0.2000 |
| 4 | 0.4000 | 0.4500 | 0.1500 |
| 5 | 0.3500 | 0.4500 | 0.2000 |
| 6 | 0.3000 | 0.4000 | 0.3000 |
| 7 | 0.2000 | 0.4000 | 0.4000 |
| 8 | 0.3750 | 0.4750 | 0.1500 |
| 9 | 0.3500 | 0.3500 | 0.3000 |
| 10 | 0.3250 | 0.3250 | 0.3500 |
| 11 | 0.3000 | 0.3500 | 0.3500 |
| 12 | 0.3500 | 0.4000 | 0.2500 |
| 13 | 0.2500 | 0.3500 | 0.4000 |
| 14 | 0.2250 | 0.3250 | 0.4500 |
| 15 | 0.2500 | 0.3000 | 0.4500 |
| 16 | 0.2000 | 0.3000 | 0.5000 |
| 17 | 0.2750 | 0.3250 | 0.4000 |
| 18 | 0.2370 | 0.3380 | 0.4250 |
| 19 | 0.2750 | 0.3500 | 0.3750 |
| 20 | 0.3000 | 0.3750 | 0.3250 |
| 21 | 0.2625 | 0.3125 | 0.4250 |
| 22 | 0.2625 | 0.3375 | 0.4000 |
| 23 | 0.2500 | 0.3250 | 0.4250 |
| 24 | 0.2375 | 0.3125 | 0.4500 |
| 25 | 0.4000 | 0.3750 | 0.2250 |
| 26 | 0.4000 | 0.3000 | 0.3000 |
| 27 | | | |
| 28 | 0.2750 | 0.3250 | 0.4000 |
| 29 | 0.3500 | 0.3000 | 0.3500 |
| 30 | 0.4000 | 0.3000 | 0.3000 |
| 31 | | | |

TABLE 4-continued

| | $rM^1TiO_3$-$sM^1(Al_{0.5}M^2_{0.5})O_3$-$tM^1_{1/3}M^2_{2/3}O_{8/3}$ | | |
|---|---|---|---|
| | r | s | t |
| 32 | 0.2750 | 0.3250 | 0.4000 |
| 33 | | | |
| 34 | | | |
| 35 | | | |
| 36 | | | |
| 37 | | | |
| 38 | 0.4000 | 0.3750 | 0.2250 |
| 39 | | | |
| 40 | 0.2750 | 0.3250 | 0.4000 |
| 41 | | | |
| 42 | | | |
| 43 | | | |
| 44 | | | |
| 45 | | | |
| 46 | | | |
| 47 | | | |
| 48 | | | |
| 49 | | | |

The dielectric part according to the invention is not restricted in use but usable in various electronic components to be used in the microwave area and the milliwave area. Examples of these various electronic components include individual parts such as filters, duplexers, resonators, LC devices, couplers, diplexers, diodes, dielectric antennas and ceramic condensers. Further examples thereof include boards such as multipurpose boards, functional boards having various functional parts embedded therein (for example, multilayer LTCC devices), packages such as MPU and SAW, and modules having at least one of these individual parts, boards and packages. These electronic components are usable in various mobile communication devices using radio waves in the microwave area and/or the milliwave area, mobile communication base devices, satellite communication devices, satellite communication base devices, satellite broadcast devices, wireless LAN devices and Bluetooth (registered trade name) devices.

This application is based on Japanese Patent application JP 2004-288660, filed Sep. 30, 2004, the entire content of which is hereby incorporated by reference, the same as if set forth at length.

What is claimed is:

1. A dielectric material consisting of (i) at least one of Ca and Sr; (ii) Ti, a portion of which is optionally substituted by Sn; (iii) Al, a portion of which is optionally substituted by a member selected from the group consisting of Ga, Y and Yb; (iv) at least one of Nb and Ta; (v) O; and (vi) optionally Mn
   wherein the elements (i) to (v) fulfill the following requirements when represented by a compositional formula, $aM^1O$-$bM^3O_2$-$(½)cM^4_2O_3$-$(½)dM^2_2O_5$
   wherein $M^1$ represents at least one of Ca and Sr; $M^2$ represents at least one of Nb and Ta;
   $M^3$ represents Ti or Ti and Sn when Sn is present; $M^4$ represents Al and when present one or more of Ga, Y and Yb and a, b, c and d represent each a molar ratio, provided that a+b+c+d=1:
   $0.436 < a \leq 0.500$;
   $0.124 < b \leq 0.325$;
   $0.054 < c \leq 0.150$; and
   $0.170 < d < 0.346$.

2. The dielectric material as claimed in claim 1, wherein a, b, c and d fulfill the following requirements:
   $0.436 < a \leq 0.500$;
   $0.124 < b \leq 0.300$;
   $0.062 < c \leq 0.150$; and
   $0.170 < d < 0.346$.

3. The dielectric material as claimed in claim 1, wherein a, b, c and d fulfill the following requirements:
   $0.436 < a \leq 0.500$;
   $0.124 < b \leq 0.275$;
   $0.069 < c \leq 0.150$; and
   $0.170 < d < 0.346$.

4. The dielectric material as claimed in claim 1, wherein a, b, c and d fulfill the following requirements:
   $0.444 < a \leq 0.500$;
   $0.133 < b \leq 0.275$;
   $0.075 < c \leq 0.150$; and
   $0.170 < d \leq 0.323$.

5. The dielectric material as claimed in claim 1, wherein a, b, c and d fulfill the following requirements:
   $0.451 < a \leq 0.500$;
   $0.141 < b \leq 0.275$;
   $0.079 < c \leq 0.150$; and
   $0.170 < d \leq 0.300$.

6. The dielectric material as claimed in claim 1, wherein 0.01 to 5% by mol of Mn in terms of $MnO_2$ by referring a total molar content of metal elements, in terms of oxides, is present in the dielectric material as to 100% by mol.

7. The dielectric material as claimed in claim 1, wherein 0.01 to 2% by mol of Mn in terms of $MnO_2$ by referring a total molar content of metal elements, in terms of oxides, is present in the dielectric material as to 100% by mol.

8. The dielectric material as claimed in claim 1, wherein 0.01 to 1% by mol of Mn in terms of $MnO_2$ by referring a total molar content of metal elements, in terms of oxides, is present in the dielectric material as to 100% by mol.

9. The dielectric material as claimed in claim 1, wherein 0.01 to 0.6% by mol of Mn in terms of $MnO_2$ by referring a total molar content of metal elements, in terms of oxides, is present in the dielectric material as to 100% by mol.

10. The dielectric material as claimed in claim 1, wherein less than 30% by mol of Ti is substituted by Sn by referring a total Ti content in the dielectric material as to 100% by mol.

11. The dielectric material as claimed in claim 1, wherein less than 30% by mol of Al is substituted by at least one member selected from the group consisting of Ga, Y and Yb by referring a total Al content in the dielectric material as to 100% by mol.

12. An electronic component including a dielectric member made of the dielectric material as claimed in claim 1.

13. The dielectric material as claimed in claim 1, having a dielectric constant $\in_r$ of from 45 to 63 and a temperature factor $\tau_f$ of resonance frequency of from −15 to +15 ppm/°C.

14. The dielectric material as claimed in claim 1, having a dielectric constant $\in_r$ of from 48 to 60 and a temperature factor $\tau_f$ of resonance frequency of from −15 to +15 ppm/°C.

15. The dielectric material as claimed in claim 1, having a dielectric constant $\in_r$ of from 48 to 58, a temperature factor $\tau_f$ of resonance frequency of from −15 to +15 ppm/°C. and a product $Q_u \cdot f_0$ of unloaded quality factor $Q_u$ and resonance frequency $f_0$ of 10000 GHz or higher.

16. The dielectric material as claimed in claim 1, wherein $0.1824 \leq d < 0.346$.

* * * * *